United States Patent
Sellers et al.

(10) Patent No.: US 7,415,666 B2
(45) Date of Patent: Aug. 19, 2008

(54) METHOD AND SYSTEM FOR NAVIGATING PAGINATED CONTENT IN PAGE-BASED INCREMENTS

(75) Inventors: Timothy D. Sellers, Bellevue, WA (US); Heather L. Grantham, Redmond, WA (US); Joshua A. Dersch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 11/073,189

(22) Filed: Mar. 4, 2005

(65) Prior Publication Data
US 2006/0200764 A1  Sep. 7, 2006

(51) Int. Cl.
*G06F 17/27* (2006.01)
*G06F 17/21* (2006.01)

(52) U.S. Cl. ............ 715/251; 715/200; 715/243; 715/273; 715/277; 715/784; 715/785; 715/786

(58) Field of Classification Search .......... 715/500, 715/517, 525, 526, 784–786, 200, 243, 251, 715/273, 277
See application file for complete search history.

(56) References Cited

U.S. PATENT DOCUMENTS

| | | | | |
|---|---|---|---|---|
| 5,463,725 A | * | 10/1995 | Henckel et al. | 715/776 |
| 5,764,227 A | * | 6/1998 | Ishimine | 715/807 |
| 6,157,381 A | * | 12/2000 | Bates et al. | 715/786 |
| 6,972,776 B2 | * | 12/2005 | Davis et al. | 345/684 |
| 2002/0030667 A1 | * | 3/2002 | Hinckley et al. | 345/173 |
| 2002/0116421 A1 | * | 8/2002 | Fox et al. | 707/526 |
| 2003/0126557 A1 | * | 7/2003 | Yardumian et al. | 715/513 |

* cited by examiner

Primary Examiner—Joshua D Campbell
(74) Attorney, Agent, or Firm—Workman Nydegger (57) ABSTRACT

A method and system in a document viewer for scrolling a substantially exact increment in a document, such as one page, regardless of whether the zoom is such that some, all or one page is currently being viewed. In one implementation, pressing a Page Down or Page Up keyboard key/button allows a user to begin at any starting vertical location within a page, and navigate to that same location on the next or previous page. For example, if a user is viewing a page starting in a viewing area from the middle of that page and ending at the bottom, a Page Down command will cause the next page to be shown in the viewing area starting at the middle of the next page and ending at the bottom of the next page. Similar behavior occurs when there is more than one column of pages being displayed in a row.

14 Claims, 7 Drawing Sheets

METHOD AND SYSTEM FOR NAVIGATING PAGINATED CONTENT IN PAGE-BASED INCREMENTS

FIELD OF THE INVENTION

The invention relates generally to computers, and more particularly to displaying content on a computer system.

BACKGROUND

One of the most common uses of computer systems is to display content in documents. Contemporary computer systems and programs provide great flexibility in viewing a document, including jumping to hyperlinked locations in the document, zooming in and out of the content, allowing a user to jump to a desired page by indicating a desired page number, scroll and use keyboard keys to navigate the document, and perform many other document viewing options.

However, pressing the Page Down or Page Up keyboard buttons to navigate content provides sometimes unexpected results for many viewers. More particularly, unless the zoom percentage setting and/or size of the window is coincidentally set such that an entire page is shown at once, pressing the Page Down or Page up key does not move the content a full page. Such behavior is the default experience in applications. For example, when the zoom is set such that the page is larger than the viewing area, pressing Page Down when at the top of the page does not page down an entire page, but instead shifts the content that is shown in the viewing area such that some lower portion of the current page (e.g., the bottom of the current page) is shown. At least one other Page Down key press is required to shift the view to show the top of the next page. In the opposite direction, at such a zoom percentage more than one Page Up is required to actually shift the content up an entire page.

Thus, when a user wants to consistently review a particular area of each page, for example, such as to inspect the content in each page's header or footer, the user has to use multiple key presses per page, unless the user can tolerate (and is knowledgeable enough to know to set) a zoom percentage that causes a Page Up or Page Down to jump the precise amount. For some viewers, even being close is not adequate, as the page top/bottom will gradually move in one direction as the user pages up or down. Moreover, in some situations, a relatively large zoom percentage is needed by the user, such as when the display area is relatively small and/or the content to be viewed has to be zoomed-in to a sufficient extent to properly review it. In such situations, decreasing the zoom to cause an exact one-page scroll on a Page Up or Page Down is not an option.

What is needed is an improved method and system for that allows users to navigate in precise increments when pressing the Page Up or Page Down key (or an equivalent action).

SUMMARY

Briefly, the present invention provides a method and system for scrolling a substantially exact increment in a document, such as a row height corresponding to a row of one or more pages of a page set, so as to display a next page set from the precise vertical location into the page that the previous page set started, regardless of the current zoom percentage. For example, if the middle of a page set is at the top of the viewing area, after scrolling, the middle of the next page set is at the top of the viewing area. This operation occurs on receiving specific user input, e.g., a Page Up or Page Down key command.

A document viewing component, such as in the form of a control hosted in a program, controls the scrolling operation, such as by containing a scroll control. The document viewing control scrolls visible content of a document down or up in a precise increment, including when more than one row of at least one page (a page set) is visible at once, as well as when the current zoom percentage setting does not allow an entire page of content to be shown at once. To this end, a document is laid out by the document viewer control such that the start of the document is at zero pixels vertical offset, and each page set (determined by the number of columns) has a given row height. The document viewing control tracks where it is within the document by keeping a "Vertical Offset" value that is based on the row number, the row height, and any offset into the row, with a zero row offset being the start of a row, e.g., the top of the pages.

When an incremental scroll command (e.g., Page Up or Page Down) is received, the document viewing control recalculates its current vertical offset, e.g., by adding exactly the row height for a Page Down or subtracting the row height for a Page Up. The document viewing control then displays the document content starting at the new vertical offset.

Different size pages in the same document may be handled by adjusting the zoom as well as changing the current vertical offset to a new value.

Other aspects will become apparent from the following detailed description when taken in conjunction with the drawings, in which:

DETAILED DESCRIPTION

Exemplary Operating Environment

Figure 1:
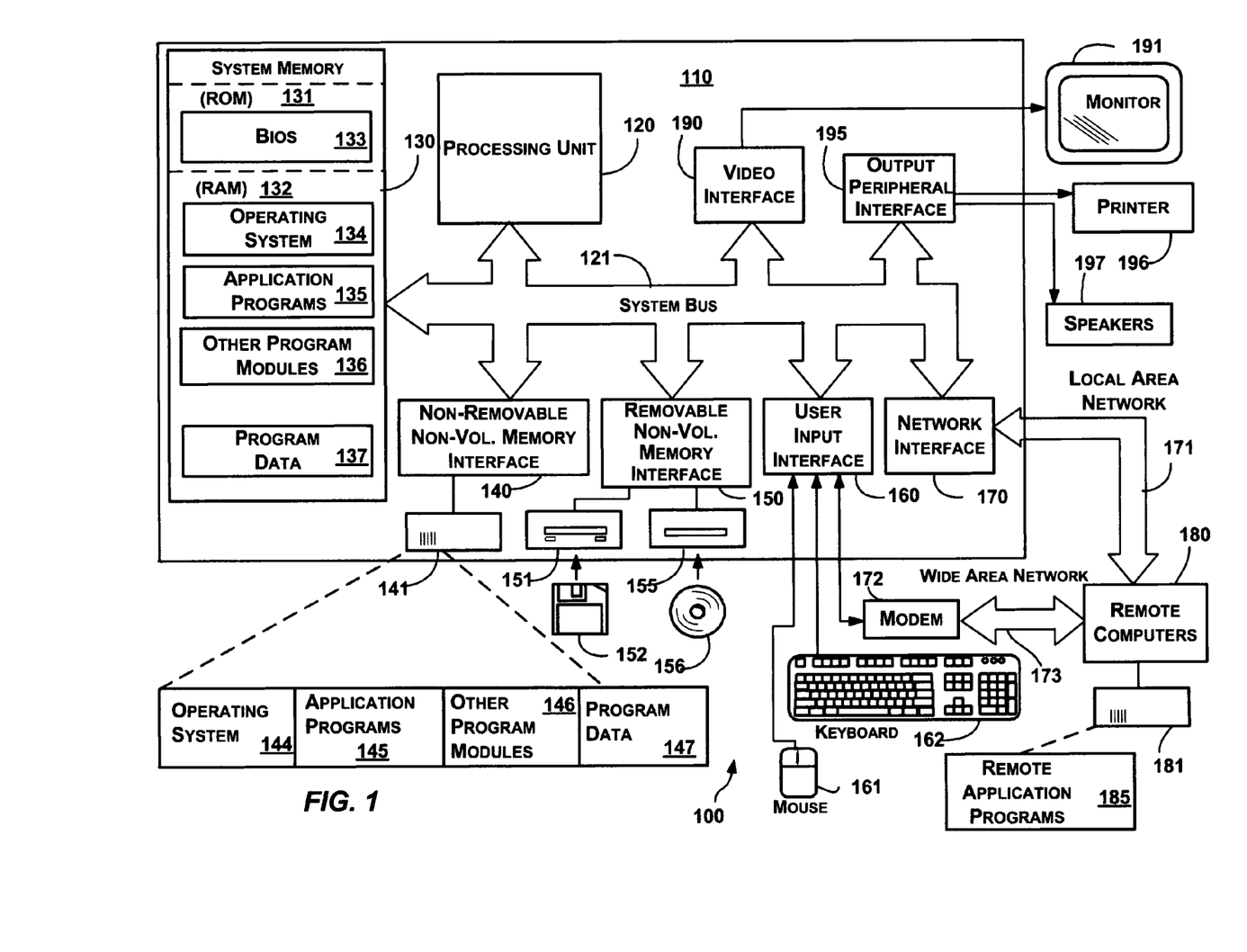
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Page Down or Page Up Navigation

The present invention is generally directed towards reacting to specific user input (e.g., a Page Up or Page Down key command) to scroll a substantially exact increment in a page set comprising at least one page, e.g., one page in a single column arrangement, two pages in a two column page arrangement, and so forth. The result is that if the top of the viewing area is, for example, one-third of the way into a page, the next page in the appropriate direction will also be displayed starting one-third of the way into that next page.

As will be also understood, numerous ways to implement the present invention are feasible, and only some of the alternatives are described herein. For example, the present invention is primarily described below with reference to a control object model in which objects (that may contain other objects) are hosted in an application program or the like. However, this is not necessary to the present invention, and, for example, any given program could implement similar logic directly, or via another mechanism, such as a library. As such, the present invention is not limited to any particular examples or implementation described herein, but rather may be used various ways that provide benefits and advantages in computing in general.

Figure 2:
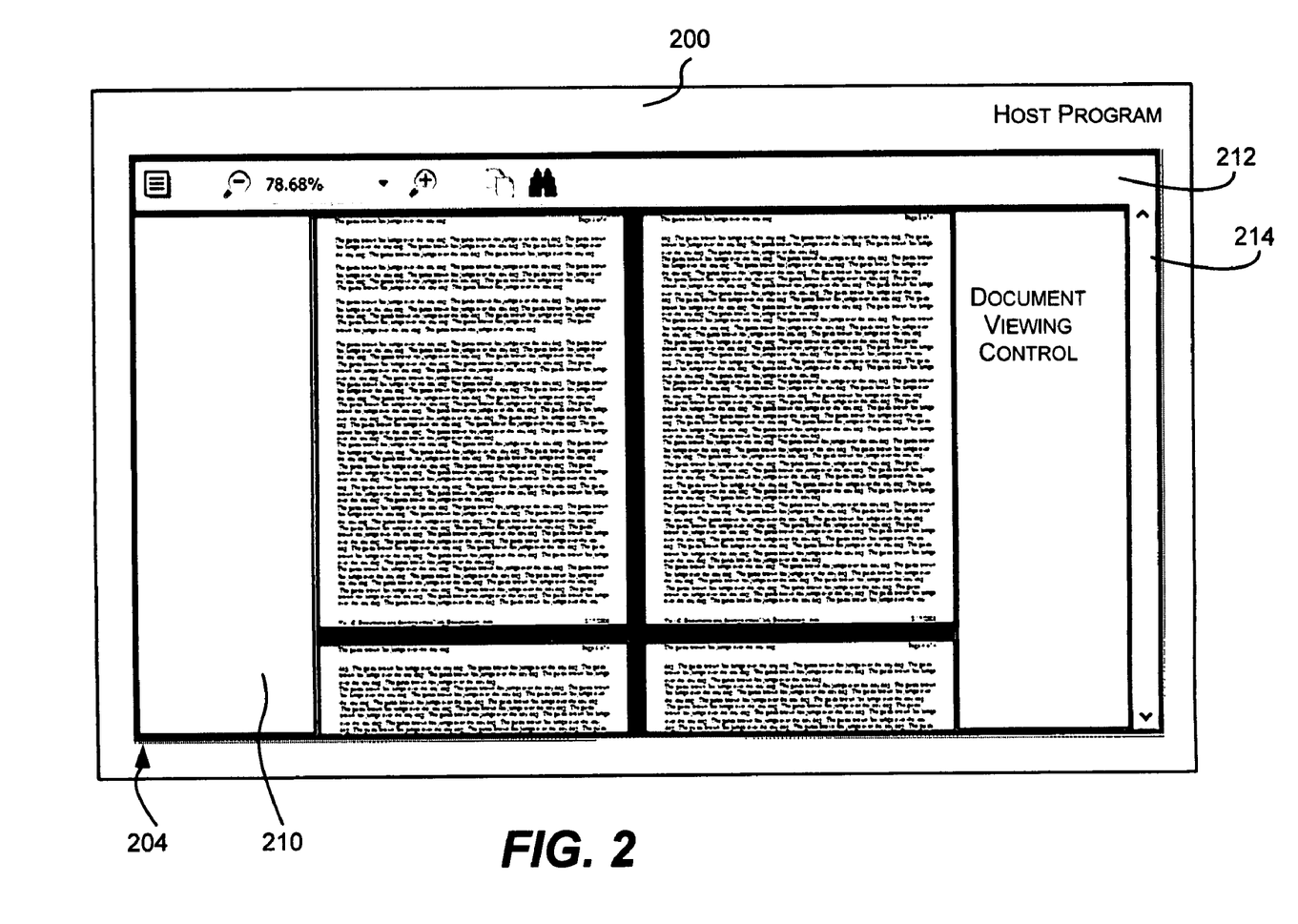
FIG. 2 is a block diagram representing an exemplary configuration in which a document viewing control may be hosted by a program, in which the document viewing control may provide precise one-page scrolling in accordance with various aspects of the invention.

Turning to FIG. 2, there is shown a block diagram representing an exemplary configuration in which the present invention may operate in accordance with various aspects of the invention. The configuration includes a host (e.g., application) program 200 and a document viewing control 204 that displays content in its viewing area, referred to as a viewport 210, wherein as used herein, a document includes essentially any type of visible content, and thus may include text, graphics, animated text and/or graphics, and video, or any combination thereof. The host program 200 comprises a computer program that executes on a computer system, such as the computer system 120 of FIG. 1, and may be a conventional application program, an operating system component or utility, another control, and so forth.

In addition to providing the viewport 210 with which to view documents, the document viewing control 204 may also display user interface elements, such as one or more icons on a toolbar 212 for accessing and modifying the way the document is viewed. For example, a user may zoom in and out by clicking on the appropriate icons, may select a desired zoom percentage from a dropdown list, and directly type in a desired zoom percentage value. Another example of controls in the toolbar includes Page Up and Page Down buttons. Another choice that may be available to viewers is to select the number of columns to display, e.g., two columns in the displayed document of FIG. 2. Further, in one implementation, a scrollbar 214 is provided that allows the viewer to change the current vertical position within the document, by scrolling with relatively fine control.

Figure 3:
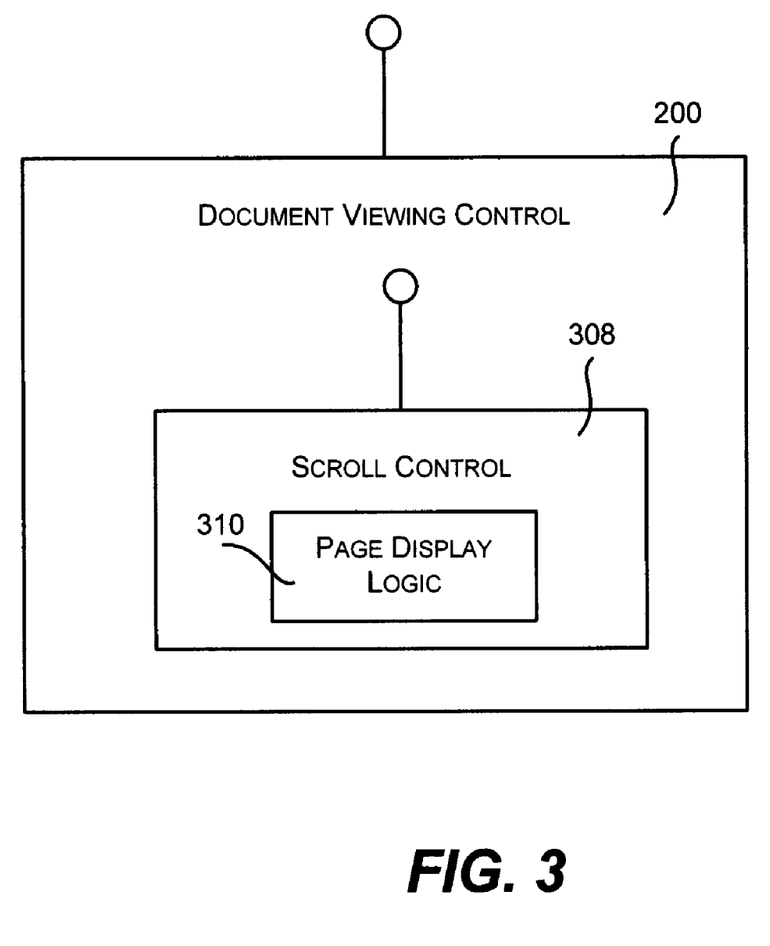
FIG. 3 is a representation of the document viewing control having an interface for hosting by a program, and containing a scroll control including logic to provide precise one-page scrolling in accordance with various aspects of the invention.

In one implementation, generally represented in FIG. 3, the document viewing control 204 comprises an object that may expose several properties and commands when instantiated, hosted and executed. The document viewing control 204 may provide its own methods, and may essentially contain other objects to perform other functionality. For example, the document viewing control 204 may contain a scroll control 308 that handles scrolling behavior via page display logic therein. Input from a pointing device into the document viewing control 204 via its toolbar 212 and 214 may be received at the scroll control 308, such as via an interface called by the document viewing control 204. Keyboard input may be provided to the document viewing control 204 via an interface to the application program, and that keyboard input which involves scrolling may be provided to the scroll control 308 via its interface.

In accordance with an aspect of the present invention, the document viewing control 204 is configurable to scroll (shift) visible content of a document down or up in a precise increment of one page set, when the Page Down or Page Up key is pressed or Page Down or Page Up commands are executed, respectively. This includes when more than one row of at least one page (a page set) is visible at once, as well as when the current zoom percentage setting does not allow an entire page of content to be shown at once. This single page-set scrolling may be selectively activated and deactivated as such behavior as desired, e.g., via modifier keys, a key combination, clicking on an icon, or the like. Note that the use of Page Down or Page Up keys is only one example of keys that can be used for this single-page scrolling command, and, for example, it is equivalent to have any other keys provide the command, e.g., a Shift-Page Down or Shift-Page Up key (or Control- and/or Alt-) may serve as the keys that invoke single page set scrolling behavior. Also, a set of icons may be provided that when clicked invoke single-page set scrolling in accordance with the present invention. Thus, although the present invention is described herein with reference to Page Up and Page Down keys generating the command, it is equivalent to have different keys or other input mechanisms used in a given configuration.

Note that it is feasible to have the user configure a zoom-independent increment of something other than a page set, e.g., exactly two page sets, exactly one-half page set, and so on. Indeed, as described below, in multi-column operation something like this is done automatically, e.g., if pages one and two are being shown side by side, a Page Down command will result in pages 3 and 4 being displayed in a single page set (a single row of two pages) scrolling operation. Thus, although many of the examples herein are primarily directed towards single-page set navigation, the increment may be different.

Moreover, although in one implementation the shift in content will not scroll beyond the start or end of the document, page wrapping is feasible; for example, a Page Up command at the start of the first page of the document may scroll to show the start of the last page of content. It is also feasible to have different behaviors for the Page Down and Page Up keys, e.g., the Page Down key scrolls a single page set independent of the zoom, while the Page Up key is not, or vice-versa. Still further, the zoom may be a factor at times, such as to have a configuration in which when the zoom percentage is zoomed-in such that less than a full page of content fits vertically, the Page Down and Page Up keys scroll a single page set, but when a page set or more fits vertically, the behavior following the Page Down and Page Up keys may be different.

Figure 4:
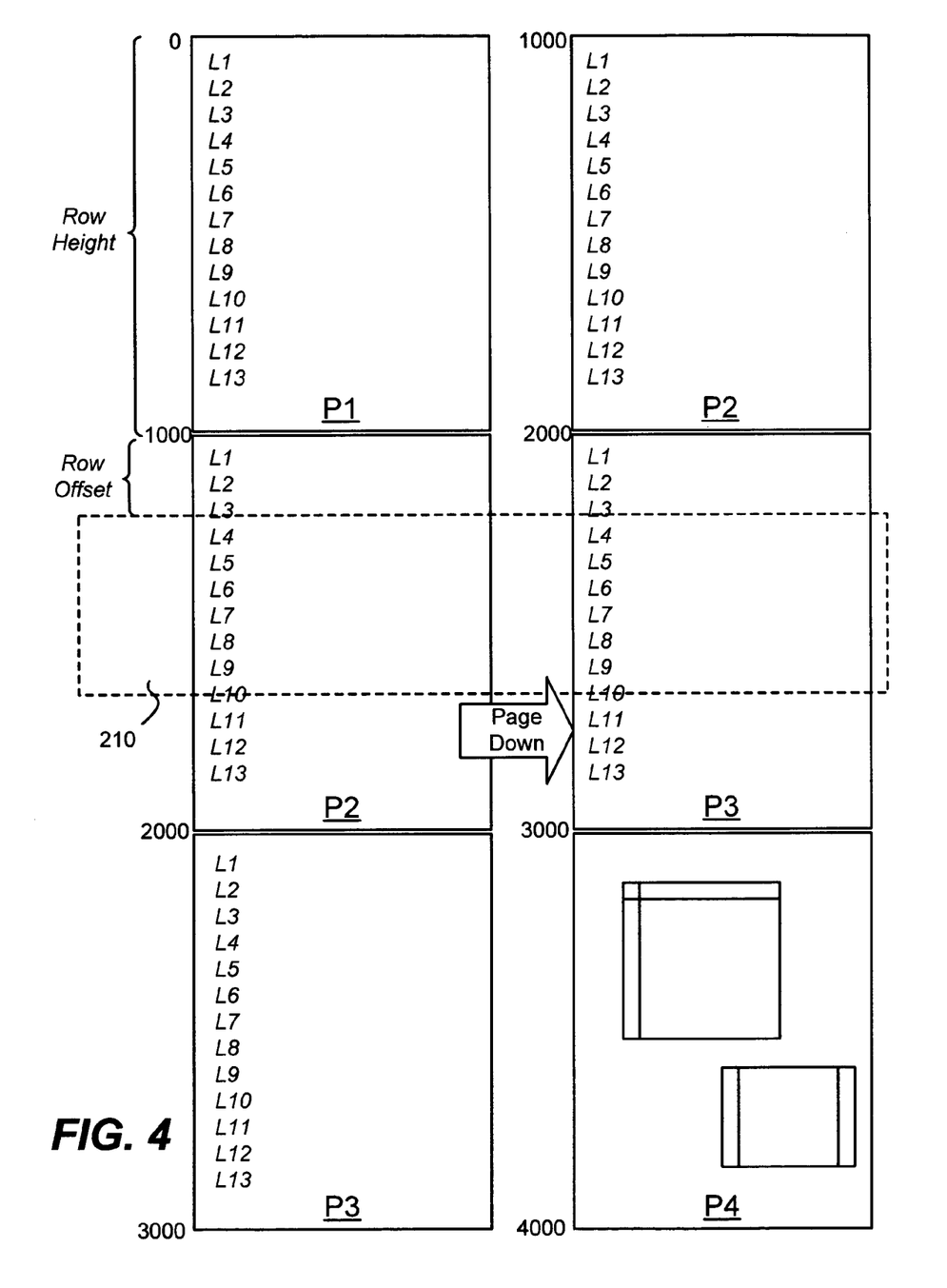
FIG. 4 is a representation of pages of a (relatively) zoomed-in document including a page portion visible in a viewing area displaying the content (the viewport) before and after scrolled via a Page Down command, in accordance with various aspects of the invention.

FIG. 4 is a representation of a document as it is scrolled over time relative to the viewing area of the document viewing control 204, that is, the viewport 210. Note that FIG. 4 is not a representation of two columns of pages (in a row) as in FIG. 2, but rather is a single column that is vertically scrolled over time. In other words, the left group of stacked pages P1-P3 is before the scrolling that results from a Page Down command, and the right group of stacked pages P2-P4 are after the scrolling that results from the Page Down command.

In general, a document is laid out by the document viewing control 204 such that the start of the document is at zero pixels vertical offset, and each page set has a given row height determined by the height (or heights) of the page (or pages) in the row. For a single column layout as in FIG. 4 in which page P2 vertically follows page P1 (rather than being in another column), the next page in order has a vertical offset of the previous page's vertical offset plus the row height. In FIG. 4, in which pages are the same size, this is exemplified by the numbers to the left of the pages, e.g., page P1 starts at zero pixels, page P2 at 1000 pixels, page P3 at 2000 pixels, and so on. Note that the slight gap between pages is part of the row height, which is 1000 (e.g., 0-999) in this example, as indicated in FIG. 4 by the bracketed vertical length denoted "Row Height." Further, note that the row height changes with zoom, since zooming changes the number of pixels per page.

The document viewing control 204 tracks where it is within the document by keeping a "Vertical Offset" value that is essentially the page number minus one, divided by the number of columns, times the row height. In the example of FIG. 4, page P3 starts at a Vertical Offset of 2000 pixels with a row height of 1000, because ((3−1)/1)*1000=2000.

However, because via zooming, cursor key (down/up arrow) scrolling, scrolling via scrollbars and mouse wheels or the like, a viewer need not always see the start of a page in the viewport 210. In fact, this is the situation in the example of FIG. 4 where the viewport 210 starts showing page P2 (or page P3) somewhere between lines L3 and L4. To this end, the user can scroll into (shift) a page by some number of pixels. This amount is the offset into the row (corresponding to the page set), or the row offset, as indicated in FIG. 4 by the bracketed vertical length denoted "Row Offset."

Thus, although 2000 is the vertical offset where page P3 starts, in FIG. 4 there is scrolling into page P3; the viewport shows from the Vertical Offset, and the Vertical Offset also includes any row offset. In other words, the page set start number is added to any row offset to give the Vertical Offset that is the exact starting location of the viewport 210.

As can be seen in FIG. 4, the viewport 210 is shown as a dashed box in which the document's pages P1-P3 are scrolled via a Page Down command. In response to the Page Down command, the pages have shifted up (the right pages P2-P4), so that instead of the viewport 210 showing a portion of page P2, the viewport 210 shows a portion of page P3. Significantly, and in keeping with the present invention, the scrolling is such that the place where the viewport starts displaying page P2, (the vertical offset) is somewhere approximately between line L3 and L4; the viewport's display area extends approximately the middle of line L10. Note that the use of the same line numbers L1-L10 on pages P2 and P3 are only to show the similar alignment in the viewport; in actuality there would not (typically) be any line-based alignment. Rather, pixels are used as suitable alignment units in one implementation, because graphics and the like may be on a given page, as generally represented in FIG. 4 by the images represented on page P4, and thus finer granularity than text-aligned lines or the like is more desirable.

Thus, for a Page Down command in FIG. 4, the new starting location (Vertical Offset) in the document for the viewport is basically calculated by:

Vertical Offset(new)=Vertical Offset (old)+Row Height; and, for a Page Up command:

Vertical Offset (new)=Vertical Offset (old)−Row Height.

There typically are limits on these calculations so that the viewport's view 210 does not wrap from the first page to the last or the last to the first, although such wrapping is feasible.

Figure 5:
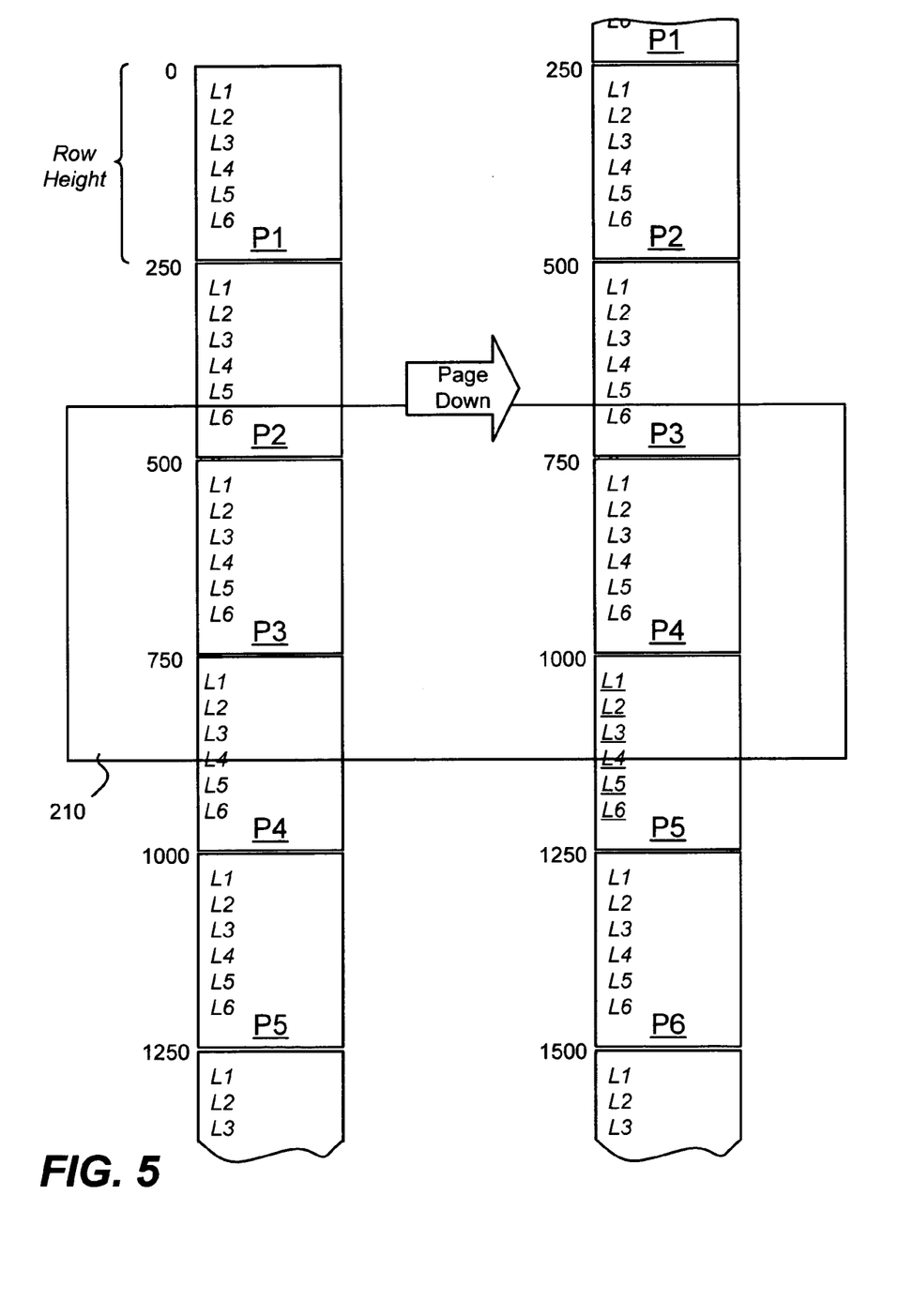
FIG. 5 is a representation of pages of a (relatively) zoomed-out document including page portions visible in a viewport before and after scrolled via a Page Down command, in accordance with various aspects of the invention.

FIG. 5 shows a slightly different (single-column) example in which the zoom percentage is such that more than one page appears in the viewport 210 at the same time. Again, these are not two columns of pages being shown, but rather a before and after representation of one column of a document's pages as they appear in the same viewport 210. Although the zoom percentage is different from that of FIG. 4, e.g., the row height equals 250 in the example of FIG. 5, it is seen that the Page Down command still results in one-page scrolling, e.g., from approximately line L6 of page P2 to line L6 of page P3 (where again, the line numbers are only for explanation purposes).

Figure 6:
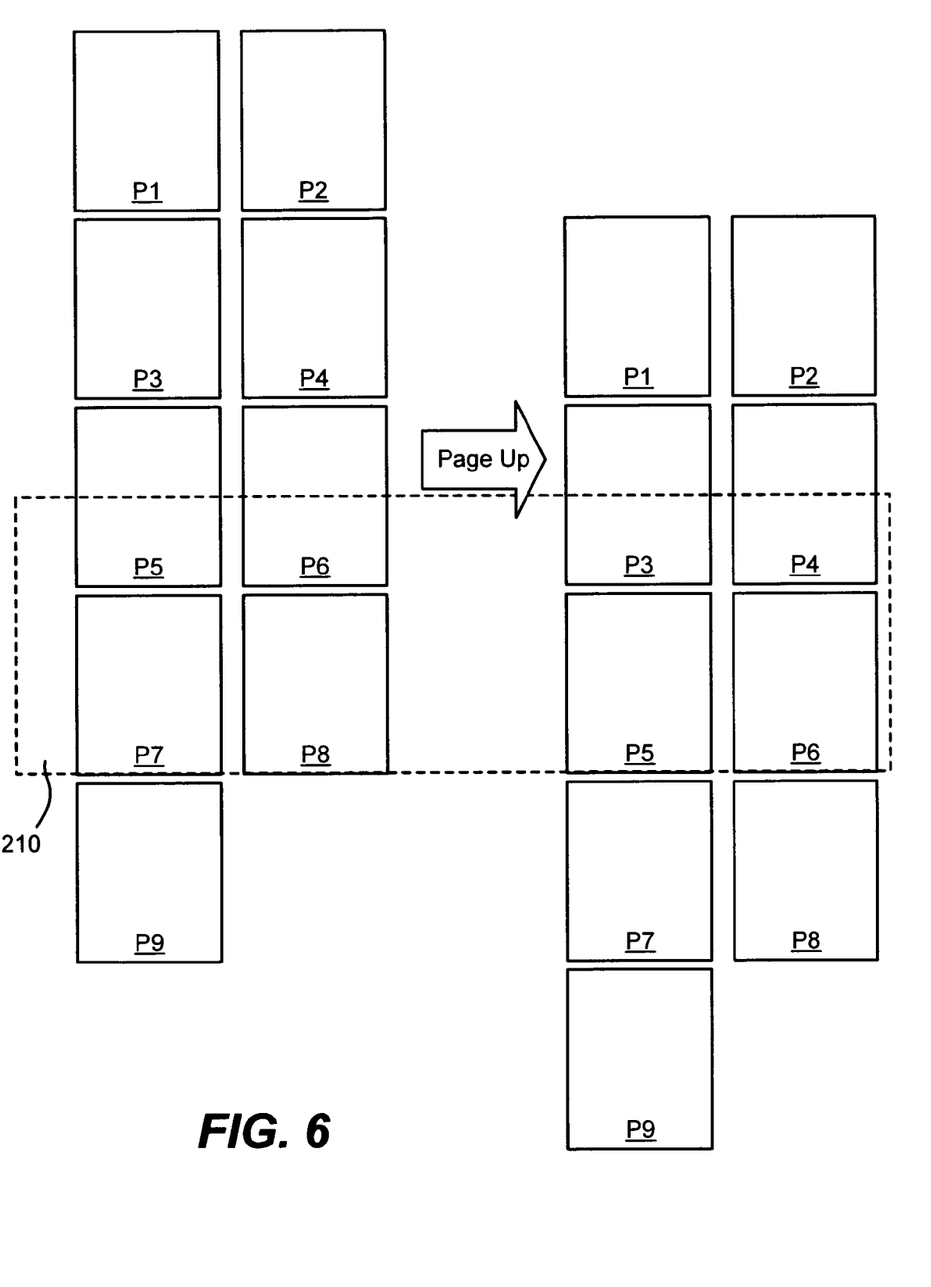
FIG. 6 is a representation of pages of a (relatively) zoomed-out document including two columns of page portions visible in a viewport before and after scrolled via a Page Up command, in accordance with various aspects of the invention.

FIG. 6 shows a representation of multiple-column (two-column) scrolling, this time in response to a Page Up command, which in effect shifts the content down. As can be seen from the viewport 210, the user is viewing the bottom of pages P7 and P8, inputs the Page Up command, and as a result sees the bottom of pages P5 and P6.

Figure 7:
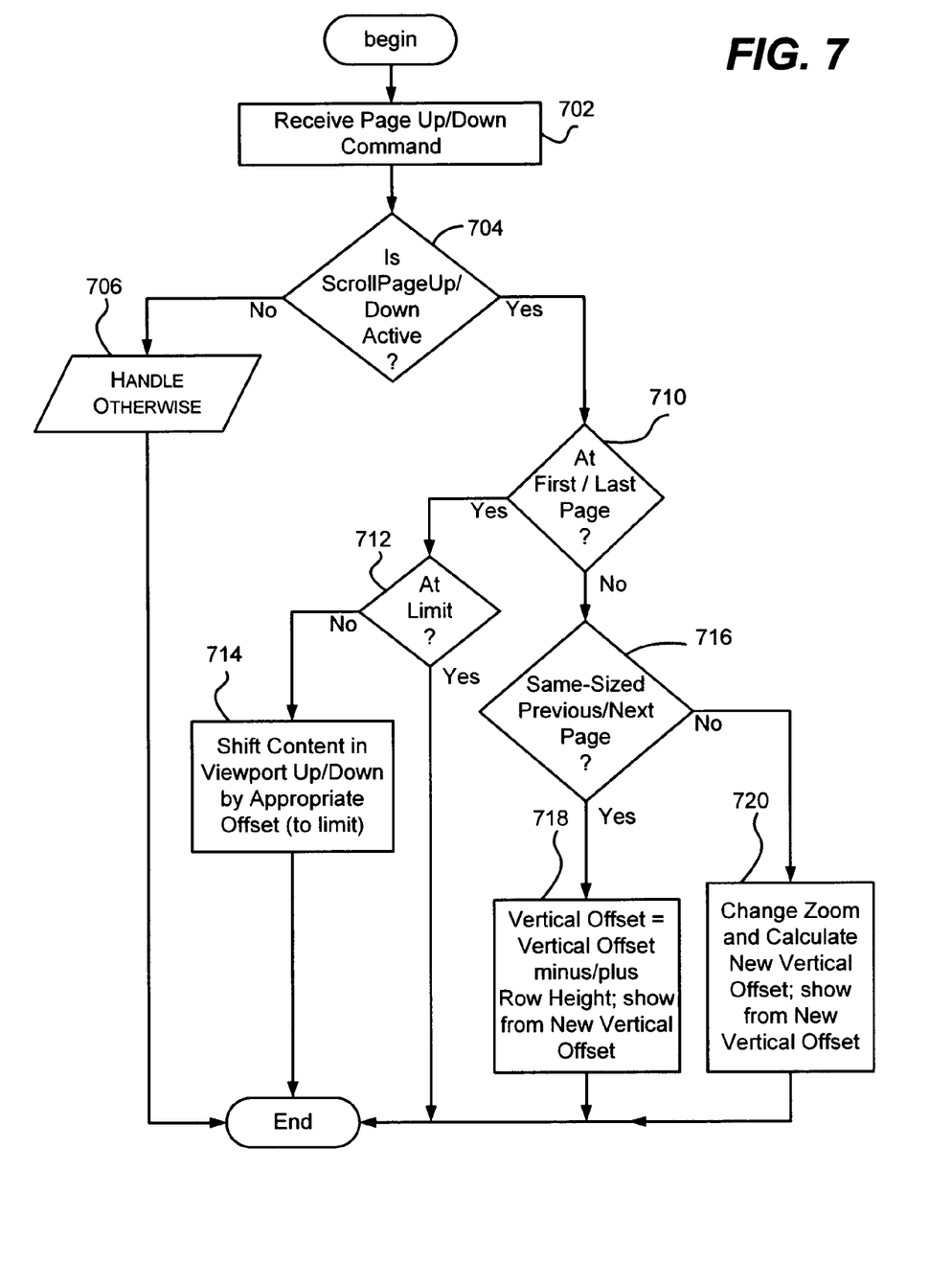
FIG. 7 is a flow diagram generally representing exemplary operations to scroll a page in accordance with various aspects of the invention.

FIG. 7 is a general overview of the example single page set scrolling logic, and represents both Page Up and Page Down commands. In FIG. 7, the process begins when a Page Up or Page Down command is received, as represented by step 702. As described above, it is possible for a user to deactivate single page scrolling, a state which is evaluated for at step 704. If not active, step 704 branches to step 706 to handle the command otherwise, and the process ends.

If active at step 704, the process branches to step 710, which represents testing whether the viewport is positioned at the first page (for a Page Up) or the last page (for a Page Down). If so, step 712 is performed, essentially to ignore the command if no further scrolling is possible because of being at the scrolling limit, that is, the start of the first page for a Page Up, or the end of the last page for a Page Down. If not at the limit, partial scrolling is available, and step 714 represents scrolling a suitable amount (e.g., the conventional zoom-based amount) towards the limit until the start or end limit is reached, as appropriate.

Returning to step 710, if not at the first page (for a Page Up) or last page (for a Page Down), step 716 is executed to evaluate whether the next page in the appropriate direction (previous for Page Up, next for Page Down) is the same size as the current page. In typical document reviewing situations, this will be the case, and step 716 will branch to step 718 to calculate the new vertical offset as described above, that is, based on the old vertical offset (which includes the row offset) minus the row height for a Page Up command, or plus the row height for a Page Down command. Step 718 also includes the change to the displayed content in the viewport 210.

Although not necessary to the present invention, different size pages may be handled via step 720 or the like. Note that single-page set scrolling may not be allowed when a document has different size pages, e.g., by having the document viewing control 204 deactivate single-page set scrolling for such documents. However, if allowed, single page-set scrolling with different-sized pages may be handled by changing the zoom, or by recalculating the offset needed for the different size page. By way of example, when a user is viewing a portrait-oriented page scrolled one-third of the way down and then causes a Page Down command to a landscape-oriented page, the result would be that the user is shown that landscape page from one-third down.

As can be seen from the foregoing detailed description, there is provided a method and system that allows users to navigate in precise increments when viewing pages of a document. The method and system handle multiple pages per row, and may be configured in various ways.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    displaying at least one page of a document that has multiple pages, at least one of the multiple pages, and the displayed at least one page including a first page displayed beginning at a starting point offset from a top of the document and from a top of the first page;
    calculating a height of at least the first page;
    calculating a row offset of the starting point of the first page;
    calculating a vertical offset at the starting point of the first page, wherein the vertical offset is calculated according to a formula of the form $\{[(p-1)/c] \cdot h\} + r$, where p is equal to the number of pages in the document, c is equal to the number of columns of the document which are simultaneously displayed, h is equal to the height of at least the first page, and r is equal to the row offset of the starting point of the first page;
    receiving a command indicative of a whole page-based incremental scroll request related to changing first content currently being displayed in the at least one page;
    determining a whole-page increment for scrolling from first content to second content, wherein determining the whole-page increment includes calculating a vertical offset at a second starting point in the document, the vertical offset being calculated according to the formula $V_1 \pm (c \cdot r)$, where $V_1$ is the vertical offset at the starting point of the first page; and
    changing the display to display second content, by replacing the at least one page of the document with at least one other page, the display of the at least one other page beginning at the second starting point.

2. The method of claim 1 wherein receiving a command indicative of a page-based incremental scroll request comprises receiving a Page Up command.

3. The method of claim 1 wherein receiving a command indicative of a page-based incremental scroll request comprises receiving a Page Down command.

4. The method of claim 1 wherein a percentage of zoom is set such that not all of the first page set is visible in the viewing area, and wherein determining the different page set comprises selecting at least a next page in the document, and which is not displayed in the viewing area with the first content, as the different page set.

5. The method of claim 1 wherein a percentage of zoom is set such that at least part of the first page set and at least part of at the different page set are visible in the viewing area, and wherein determining the different page set comprises selecting a next or previous page in the document as the different page set.

6. A computer-readable storage medium having computer-executable instructions, which when executed perform the method of claim 1.

7. A system for viewing documents, comprising:
    a document viewing component, the document viewing component including:
        means for displaying content of one or more pages of a document in a viewing area and such that a first page of the one or more pages is displayed at a starting point offset from a top of the document and from a top of the first page;
        a user-configurable scroll interface, the user-configurable scroll interface including one or more selectable scroll options allowing a user to selectively determine a scroll increment for scrolling between pages in the document, wherein the scroll options include at least a user-selectable whole page scroll increment option;
        means for receiving a page-based scroll request command to change the content being displayed to new content of another one or more pages;
        means for selecting new content of the one or more other pages based on the user-selected scroll increment, wherein said means:
            calculates a height of at least the first page;
            calculates a row offset of the starting point of the first page;
            calculates a vertical offset at the starting point of the first page according to a formula of the form $\{[(p-1)/c] \cdot h\} + r$, where p is equal to the number of pages in the document, c is equal to the number of columns of the document which are simultaneously displayed, h is equal to the height of at least the first page, and r is equal to the row offset of the starting point of the first page; and
            calculates a vertical offset at a second starting point in the document, the vertical offset at the second starting point being calculated according to the formula $V_1 \pm (c \cdot r)$, where $V_1$ is the vertical offset at the starting point of the first page; and
        means for changing the content being displayed by displaying the new content in the viewing area, and beginning at the second offset.

8. The system of claim 7 wherein the document viewing component comprises a control hosted by another program.

9. The system of claim 8 wherein the means for selecting the new content of the other page comprises an object contained in the control.

10. The system of claim 7 wherein the vertical location in the other page is based on a value corresponding to a number of pixels.

11. The system of claim 10 wherein the number of pixels varies depending on a current zoom percentage.

12. The system of claim 7 wherein the first page and at least one of the one or more other pages have different sizes.

13. In a computing environment, a method comprising:

displaying at least one page of a document having a plurality of pages, the at least one page including a first page which is displayed beginning at a starting point that is offset from a top of the document and from a top of the first page;

determining a zoom percentage for at least the first page;

calculating a height of at least the first page based on the zoom percentage, the height being calculated in number of pixels calculating a row offset of the starting point of the first page, wherein the row offset is equal to a number of pixels the starting point is shifted from the top of the first page;

calculating a vertical offset at the starting point of the first page, wherein the vertical offset is calculated according to a formula of the form: $\{[(p-1)/c] \cdot h\} + r$, where p is equal to the number of pages in the document, c is equal to the number of columns of the document which are simultaneously displayed, h is equal to the height of at least the first page, and r is equal to the row offset of the starting point of the first page;

receiving a command indicative of a request for a page-based incremental scroll in the document;

calculating a vertical offset at a second starting point in the document, the vertical offset at the second starting point being calculated according to a formula of the form $V_1 \pm (c \cdot r)$, where $V_1$ is the vertical offset at the starting point of the first page;

determining a location in the document corresponding to the vertical offset at the second starting point; and replacing the display of the at least one page of the document with at least one other page having, the display of the at least one other page beginning at the second starting point.

14. A method as recited in claim 13, wherein the height of the first page is calculated to include white space between pages.

* * * * *